W. P. McConnell.
Hydraulic Propeller for Ships.
N° 4,529. Patented May 16, 1846.
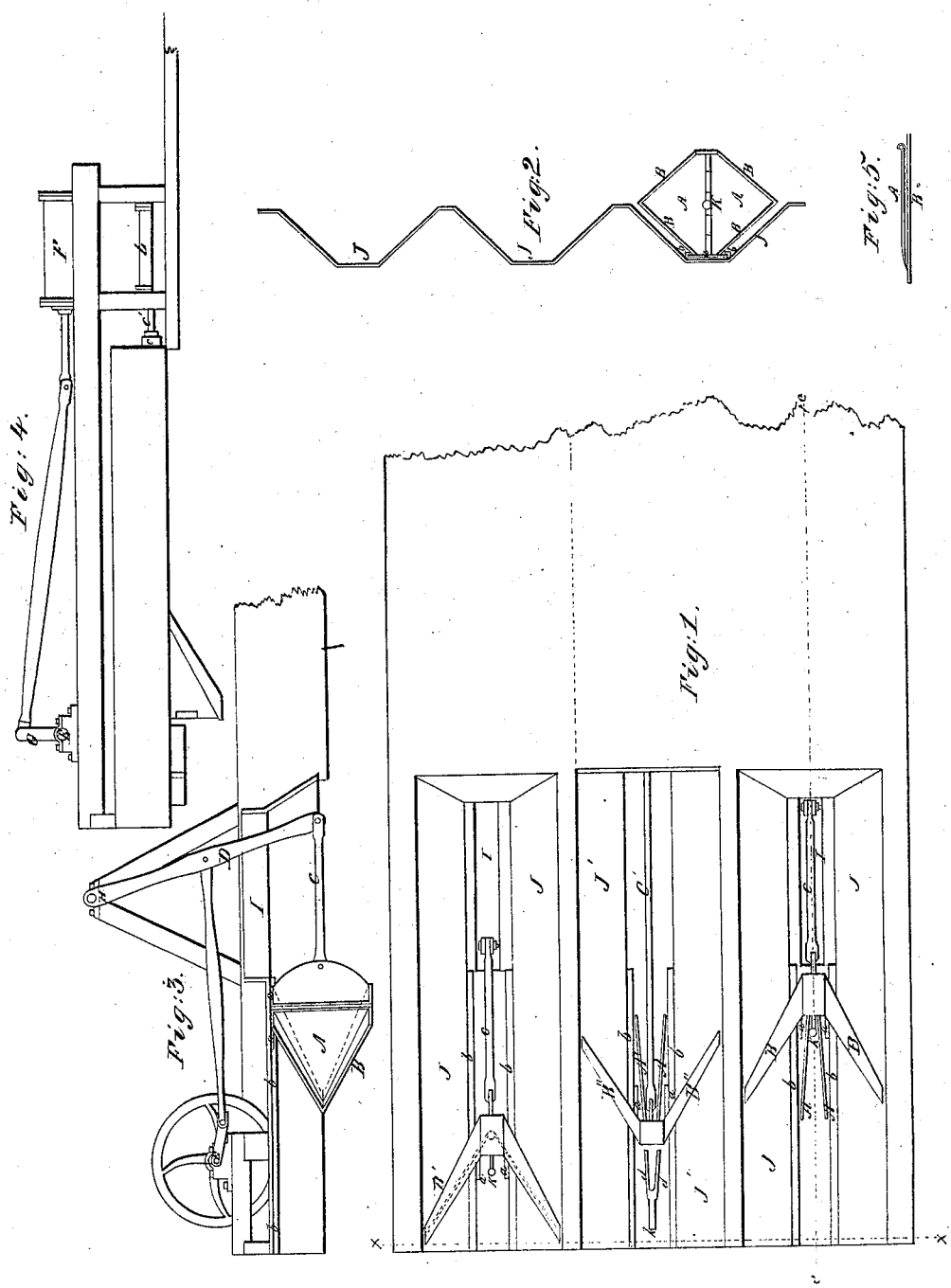

UNITED STATES PATENT OFFICE.

WILLIAM P. McCONNELL, OF WASHINGTON, DISTRICT OF COLUMBIA.

IMPROVEMENT IN PROPELLERS FOR VESSELS.

Specification forming part of Letters Patent No. 4,529, dated May 16, 1846.

*To all whom it may concern:*

Be it known that I, WILLIAM P. MCCONNELL, of the city of Washington, in the District of Columbia, have invented certain new and useful Improvements in the Apparatus for the Propelling of Canal-Boats and other Vessels; and I do hereby declare that the following is a full and exact description thereof.

My propellers are to be submerged and are to be placed immediately under the bottom of the boat. The number of propellers that I ordinarily use is three, two of them being situated near to the sides and one at the middle of the boat, the two former being the propellers proper and the latter being intended for backing the vessel. This backing apparatus is the same in form with the others, but operates in a reversed direction. The propelling part consists of two leaves or plates, which I make in the form of isosceles triangles, and which are to be hinged together at their shortest sides in the manner of the valves used in the pumps known as "Perkins' Triangular Valve Pump." Each pair of leaves is to be attached to and contained within a suitable frame within which they are made to open and close, their edges bearing against the frame when they are opened and in the position for propelling, but said leaves collapsing and coming nearly into contact with each other as they are retracted. The upper halves of the propellers with their frames are received within cavities extending along the under side of the boat, and forming one-half of a trunk to which the propeller-frames are adapted and within which they are sustained by sliding tongues operating within grooves in the upper part of the cavities. Where the water is of sufficient depth it would not be absolutely necessary that their upper halves should be contained within such semi-trunks, but the propellers might be open to the water at their upper as well as at the lower sides. It is not believed, however, that any advantage would result from their being so placed.

In the accompanying drawings, Figure 1 represents that part of the bottom of a boat that contains the propellers. Fig. 2 is a vertical transverse section of this bottom part in the line $x\,x$ of Fig. 1, showing the angular cavities in which the propellers work and one of the propellers with its propelling-leaves open and filling the frame in which it is contained. Fig. 3 is a vertical longitudinal section through Fig. 1 in the line $e\,e$. Fig. 4 shows the two steam-cylinders, which I contemplate using one above the other, the upper one being intended to actuate the propellers proper and the lower one the backing apparatus.

A A are the propelling-leaves, and B.B the rectangular frames in which they are contained. In the frame B′, where the propelling-leaves are supposed to be open, their place within the frame is represented by dotted lines. Each of the frames B has its upper part sliding in grooves at the upper part of the cavities J J. These frames may be considered as making a part of a rectangular trunk of which all the parts are cut away but those that are to receive and sustain the propelling-leaves. These leaves are free, therefore, to act upon successive portions of water and are not designed to force water through an inclosed trunk.

The rods C C, which are attached to the propeller-boxes B B, are represented as being made to move back and forth by means of levers D moved by a crank-shaft E, said shaft being made to revolve by the main steam-cylinder F, the rod of which is connected to a crank G. The propellers may, however, be moved back and forth by the direct action of the piston-rods from steam-cylinders, such rods passing through stuffing-boxes at the end of the cavities J J, as is supposed to be the case with the backing apparatus under the arrangement represented in the drawings. The crank-shaft E under this arrangement is furnished with three cranks, two of which operate the levers D, as seen in Fig. 3. These levers have their fulcrum at H, and their lower ends pass through openings I in the upper sides of the cavities J, said openings extending up above the water-line.

K is a stop-piece to prevent the leaves A A from fully closing upon each other, so as to prevent their opening by the reaction of the water on the return-stroke.

$a\,a$ are tongues attached to the propeller-frames B B and sliding in grooves formed by the pieces $b\,b$, that sustain the propellers.

The backing apparatus consists, mainly, of a reversed propeller A′ A′ with its frame B″ B″. The rod C′ attached to it may proceed directly from the lower cylinder L, Fig.

4, and when the vessel is to be backed the steam is to be admitted into this cylinder and cut off from the upper one. When the backing-leaves are not in use, they are secured between two plates $d\ d$, making a part of a stationary holdfast $k$, and are thus held closed. The rod $C'$, being below the water-line, should pass through a stuffing-box, as shown at $c$, Fig. 4.

To prevent the slamming of the propellers against the box or frame in opening, I give a slight curvature to them toward their angular points, as seen in the edge view, Fig. 5, and also make this part elastic by reducing its thickness. This arrangement has been found to be of great practical importance.

Having thus fully described the nature of my invention and shown the operation thereof, what I claim therein as new, and desire to secure by Letters Patent, is—

1. The combining, in the manner herein described, of the propellers and the analogous backing apparatus within cavities prepared to receive them, but which are entirely open below, the whole being constructed, combined, and operating, substantially in the manner set forth.

2. The giving to the leaves of said propellers a curved form and making them elastic toward their points, in combination with the frames against which they strike, for the purpose and in the manner described.

I will here remark that the frames B B may be made cylindrical and the leaves A A semi-elliptical, but this would be a mere change of form without offering any advantage, and would necessarily be considered as a modification of my apparatus.

WM. P. McCONNELL.

Witnesses:
THOS. P. JONES,
EDWIN L. BRUNDAGE.